United States Patent
Mes

(10) Patent No.: US 8,884,622 B2
(45) Date of Patent: Nov. 11, 2014

(54) 3D DIPOLE ANTENNA OF SPIRAL SEGMENTS

(76) Inventor: Marius J. Mes, College Station, TX (US)

(*) Notice: Subject to any disclaimer, the term of this patent is extended or adjusted under 35 U.S.C. 154(b) by 341 days.

(21) Appl. No.: 13/587,591

(22) Filed: Aug. 16, 2012

(65) Prior Publication Data

US 2014/0049446 A1     Feb. 20, 2014

(51) Int. Cl.
| | |
|---|---|
| G01V 3/16 | (2006.01) |
| G01V 3/08 | (2006.01) |
| H01Q 9/16 | (2006.01) |
| H01Q 21/20 | (2006.01) |
| H01Q 1/10 | (2006.01) |
| H01Q 1/28 | (2006.01) |

(52) U.S. Cl.
CPC .. *G01V 3/16* (2013.01); *H01Q 1/10* (2013.01); *G01V 3/088* (2013.01); *H01Q 9/16* (2013.01); *H01Q 21/20* (2013.01); *H01Q 1/28* (2013.01)
USPC ............ 324/330; 324/323; 324/348; 343/895

(58) Field of Classification Search
CPC ................ G01V 3/15–3/16; G01V 3/08–3/10; H01Q 1/30; H01Q 1/40; H01Q 21/26; H01Q 9/16
USPC ............................ 324/330–331, 348; 343/895
See application file for complete search history.

(56) References Cited

U.S. PATENT DOCUMENTS

| | | | | |
|---|---|---|---|---|
| 3,449,657 | A * | 6/1969 | Fredriksson et al. | 324/338 |
| 3,521,289 | A * | 7/1970 | Mayes et al. | 343/806 |
| 3,683,393 | A * | 8/1972 | Self | 343/806 |
| 6,765,383 | B1 | 7/2004 | Barringer | |
| 7,002,350 | B1 | 2/2006 | Barringer | |
| 2006/0232493 | A1 * | 10/2006 | Huang et al. | 343/895 |

* cited by examiner

*Primary Examiner* — Robert Karacsony
*Assistant Examiner* — Amal Patel

(57) ABSTRACT

A three dimensional (3D) dipole antenna system with spiral leg is described used to measure oscillatory electric field strengths. The system relies on spiral dipole leg segments of limited length attached to a cylinder. It is designed to improve the sensitivity to oscillatory electric signals in the range of 0.01 Hz to 10,000 Hz. The antenna system is connected to an object (a survey platform) that is stationary or moving in an area of interest in air, over land, on water or under water. Such antenna system is generally used as part of a prospecting survey system for water, minerals or hydrocarbons.

6 Claims, 1 Drawing Sheet

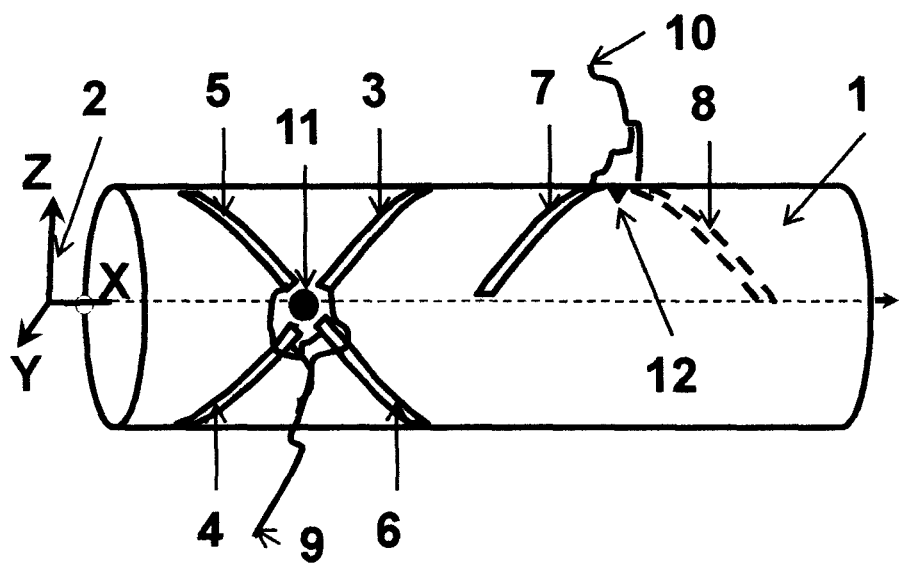

3D DIPOLE ANTENNA OF SPIRAL SEGMENTS

CROSS-REFERENCE TO RELATED APPLICATIONS

Not Applicable

STATEMENT REGARDING FEDERALLY SPONSORED RESEARCH OR DEVELOPMENT (IF APPLICABLE)

Not Applicable

REFERENCE TO SEQUENCE LISTING, A TABLE, OR A COMPUTER PROGRAM LISTING COMPACT DISC APPENDIX (IF APPLICABLE)

Not Applicable

BACKGROUND OF THE INVENTION

Diverse geophysical processes such as seismic and microseismic activity, volcanic activity, electric discharges from thunderstorms, vibrations introduced by human activities, and other phenomena generate propagating electromagnetic (EM) vibrations in the earth. The propagation and damping of these electric (E-type) and magnetic (B-type) emissions depend on the physical properties of the material in the earth. Differences in the local strength and phase characteristics of these electromagnetic vibrations can be used as indicators for the presence of water, hydrocarbons or minerals. These E-type and B-type oscillatory emissions always occur together. They can be measured separately by different sensing systems. My invention concerns an antenna system to measure E-type signals.

Moving survey platforms are used to collect such oscillatory electric signals using a three dimensional (3D) dipole antenna system. The survey platforms may consist of manned or unmanned aircraft, drones towed behind aircraft, drones suspended under helicopters, drones towed behind ships, ships, cars, trucks or a stationary object. Suitable electronic equipment is used to digitize and store these signals. The frequency of the signals of interest is in the order of 0.01 Hz to approximately 3,000 Hz. This invention concerns the antenna sensor system used to collect the oscillatory electric field strengths. A three dimensional antenna system consists of three independent dipole antenna systems that are mutually perpendicular as much as practical. The dipole antennas of a three dimensional system do not need to have a common point of intersection. The individual dipole antenna systems may be located anywhere on the survey platform. An individual dipole leg can range from approximately 0.1 meter to several meters, depending on practical limitations.

A description of prior art on which the currently used technology is based can be found in representative patents and patent applications. A patent describing similar technology is, for example: U.S. Pat. No. 7,002,350, U.S. that describes a three dimensional antenna system for a marine oil and gas exploration survey system.

BRIEF SUMMARY OF THE INVENTION

This invention describes a three dimensional dipole antenna system used to measure oscillatory electric field strengths used in certain survey systems to explore for the presence of commercial quantities of fresh water, hydrocarbons and minerals. The dipole antenna legs consist of segments of a spiral to optimize their sensitivity. That simulates a virtual cylindrical shape to the individual antenna legs. My invention is a response to the need to improve a system to measure the oscillatory electric field strengths at low frequencies up to a few kHz.

This invention advances to the state of the art by introducing a spiral shape to the dipole antenna leg segments that improves the signal to noise ratio of the low frequency electric measurements in the frequency range of interest.

BRIEF DESCRIPTION OF THE SEVERAL VIEWS OF THE DRAWINGS

FIG. 1 illustrates how our 3D Dipole Antenna of Spiral Segments could be placed, for example, but not limited to, on a tubular stinger 1 of a small survey aircraft. The axis of the tubular as depicted also is the X axis of an orthogonal coordinate system 2

The dipole legs of the three antennas are 3 and 4 for one dipole set, 5 and 6 for the second dipole set and 7 and 8 for the third dipole set. The dipole sets are connected with wires 9 and 10 to electronic receiving equipment. Ground pieces 11 and 12 made of a conducting material are placed in between the dipole legs. These ground pieces are also connected to the electronic receiving equipment.

The length of the individual dipole legs varies with the survey conditions; they do not need to be equally long. In practice the dipole leg length will be from 0.1 to 3 meters. The axis of the individual dipole antenna set is considered to be the line connecting the innermost points of the axis of the antenna legs of that dipole. It is not necessary to make the three axes of the three dipole sets mutually orthogonal. In the signal interpretation, trigonometric adjustments can be made to the signals to make them reference an orthogonal coordinate system so that they do represent signals from a three dimensional orthogonal system.

The dipole antennas may be constructed on top of or inside non-conductive tubular material and made of conducting materials, for example, but not limited to, copper strips and metal wires. The use of tubular material as a base to which to attach the dipole sets is practical because any strip in a direction other than the axial direction of the tubular automatically becomes a spiral antenna segment.

Although not common practice, it is possible to place the dipoles on a conducting surface such as, but not limited to, the aluminum skin of an aircraft, provided the dipole antenna components are separated from the conductive surface by an insulating layer and the part where the antennas are placed has a near-circular cross section. The performance of antenna systems mounted in this way is usually not optimal.

Dipole antennas as well as the ground pieces may be electrically insulated by some coating to prevent their direct contact with the air or water around them. We found that the presence of a ground piece or ground pieces only marginally improves the performance of submerged dipole antenna systems.

DETAILED DESCRIPTION OF THE INVENTION

Oscillatory electric field strength measurements are of interest to the industry for resource exploration purposes. This type of measurement requires three dimensional sensor systems for electric field strength variations. The frequency range of interest generally is from 0.01 Hz to 10,000 Hz. The upper limit is of interest for some shallow geophysical interpretation systems. Electric sensors are used to obtain the needed data. In this invention a three dimensional dipole antenna with spiral leg segments is used to measure the electric field strength variations.

The three dimensional antenna system consists of three independent dipole antenna systems that are mutually perpendicular as much as practical. The dipole antennas of a three dimensional system do not need to have a common point of intersection. The individual dipole antenna systems may be located anywhere on the survey platform. An individual dipole leg can range from approximately 0.1 meter to several meters, depending on practical limitations. As a practical guide the length of the dipole legs is limited to less than a quarter turn on the cylinder. Limiting the dipole antenna leg length also limits the possible noise caused by induction from varying magnetic field strengths. The dipole antennas are attached to a cylinder where the axis of the cylinder does not coincide with the axes of the dipole antennas. This causes the dipole antenna legs to get the shape of a spiral segment. The purpose of mounting the antenna legs this way is to give the antenna legs the virtual shape of a tubular envelope to enhance the sensitivity to the oscillatory electric signals.

The antenna legs themselves are constructed of strips or wires of metallic material that are attached to a cylinder. To enhance the sensitivity of the dipole antenna system, an antenna ground piece can be installed between the antenna legs. The ground piece can consist of a metallic object between the dipole antenna legs. The dipole legs and the ground piece are connected to the electric receiver system.

Such a 3D dipole antenna system can be constructed and connected in many ways to a survey system such as, but not limited to, the outside or the inside of a stinger made of non-conducting material of a survey aircraft. Alternatively, the 3D dipole antenna system could be attached to a cylinder that is installed inside such a stinger.

It will be understood that the above-described embodiments of the invention are illustrative in nature, and that modifications thereof may occur and be made by those skilled in the art. Accordingly, this invention is not to be regarded as limited to the embodiments disclosed herein, but is to be limited only as defined in the appended claims.

The invention claimed is:

1. A three dimensional (3D) dipole antenna system with dipole antennas, spiral leg segments of the dipole antennas and a ground for each of the dipole antennas, consisting of a ground piece of electrically conducting material placed between leg segments of the dipole antennas, the dipole antenna system for measuring the oscillatory electric field strength in air or under water for frequencies ranging from 0.01 Hz to up to 10,000 Hz, and the overall length of each leg segment is substantially 0.1 meters to 3 meters in length and extends a quarter turn of a cylinder on which the antenna system is mounted.

2. The dipole antenna system as in claim 1 in which the legs segments of the dipole antennas are mounted on an external or internal surface of cylinder that is made of an electrically non-conducting material.

3. The dipole antenna system as in claim 1 in which the leg segments of the dipole antenna system are constructed of strips or wires of metallic material.

4. The dipole antenna system as in claim 1 in which the axis of each individual dipole antenna is the line connecting the innermost points of the axis of the antenna legs of that dipole.

5. The dipole antenna system as in claim 1 in which three axes of each of respective three dipole antennas are not orthogonal to one another and their axes do not lie in the same plane.

6. The dipole antenna system as in claim 1 in which the dipole antenna system is electrically insulated from contact with surrounding air, fluids or other materials.

* * * * *